March 13, 1956 P. WORNER 2,737,994
TIRE CHAIN APPLYING ATTACHMENTS
Filed June 26, 1953 2 Sheets-Sheet 1

INVENTOR.
Peter Worner
BY George E. Cook
ATTORNEY

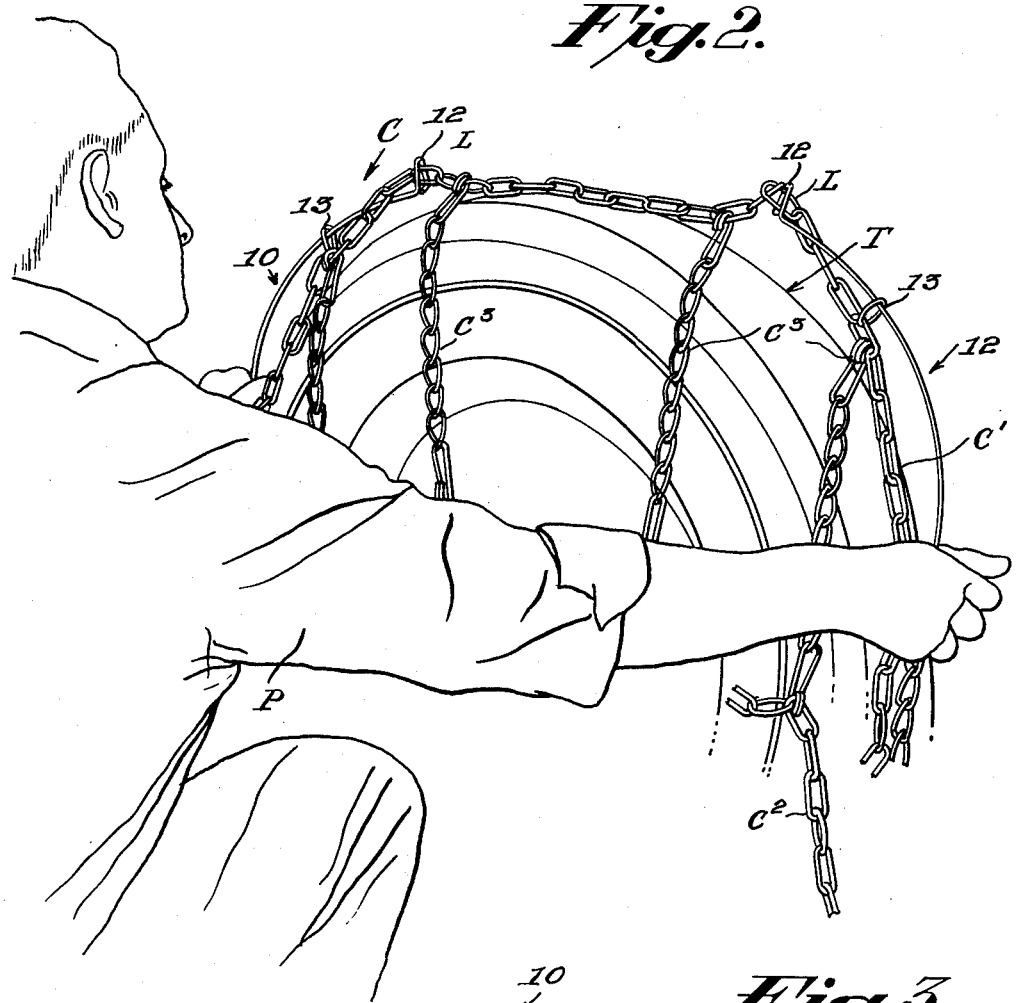
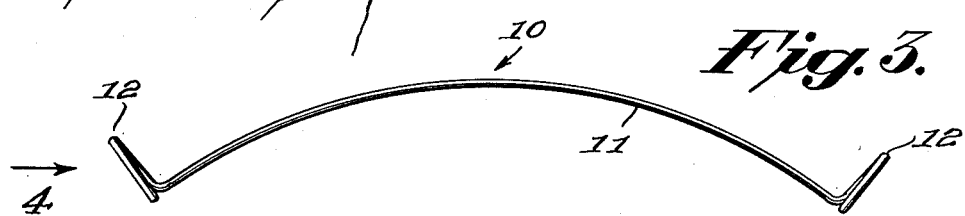
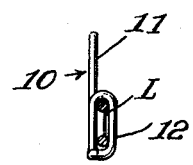

United States Patent Office 2,737,994
Patented Mar. 13, 1956

2,737,994

TIRE CHAIN APPLYING ATTACHMENTS

Peter Worner, Winona, Minn., assignor to Peerless Chain Company, Winona, Minn., a corporation of Minnesota Application June 26, 1953, Serial No. 364,275

1 Claim. (Cl. 152—213)

This invention relates to tire chain applying attachments.

The invention is more particularly concerned with devices which are readily attachable to standard tire chains and by the use of which an intermediate section of the chain may be positioned over the upper tread portion of a tire with dispatch and facility notwithstanding the fact that modern fenders pocket a substantial segment of the tire.

A primary object of the invention is to provide a pair of elongated arcuate rods attachable to the inner side chain of a standard tire chain corresponding ends of which rods are attachable to the inner tire chain adjacent the center thereof, and the opposite ends of which rods are hand engageable for lifting the central portion of the inner tire chain over the upper tread portion of a tire together with cross chains disposed between said first ends of the rods.

Further objects and advantages of the invention will become apparent in the course of the following detailed description, taken in connection with the accompanying drawings, wherein—

Fig. 2 is a fragmental perspective view showing the use of the attachments in applying the upper central portion of the chain to the tire.

Fig. 3 is an enlarged side elevational view of one of the attachments.

Fig. 4 is an end elevational view of the attachment of Fig. 3 as viewed in the direction of arrow 4 thereon.

Figure 1:
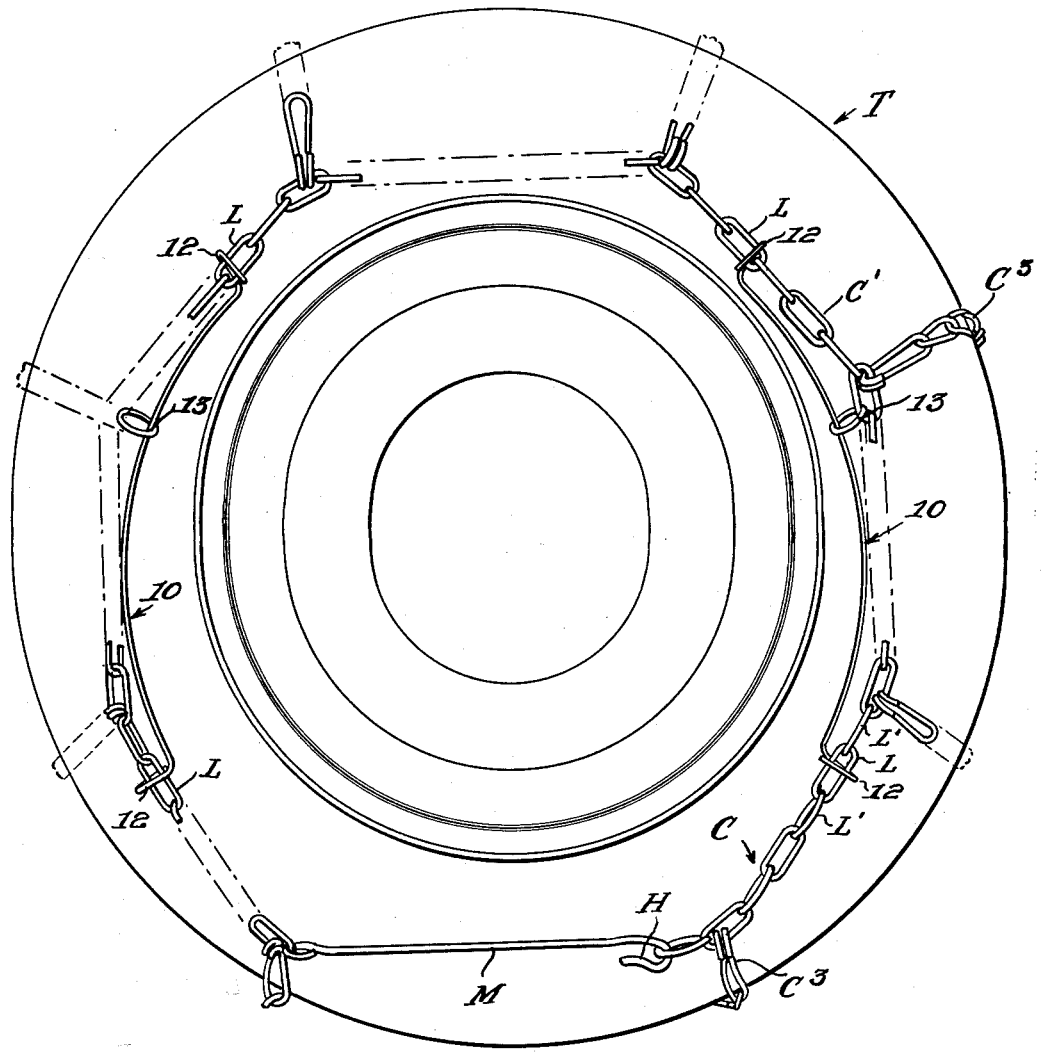
Figure 1 is an inside elevational view of a tire showing a standard tire chain applied thereto and to which chain the improved attachment is secured, the tire being shown in outline only and certain portions of the standard tire chain being shown in dotted outline.

Referring now in detail to the drawings, C designates a tire chain of known construction adapted for use on a tire T.

The tire chain C comprises inner and outer side chains $C^1$ and $C^2$ respectively together with spaced cross chains $C^3$ as is well understood.

The inner side chain $C^1$ is provided with opposite end connecting means which may comprise a relatively long hook member M having one end thereof pivotally connected to one end of the inner side chain and the other end thereof provided with a hook H adapted for releasable connection with the other end of the inner side chain as is clearly indicated in Fig. 1.

The outer side chain $C^2$ may have its ends releasably connected by any known form of hook or fastener, which is not shown.

The present invention is exclusively concerned with a novel means for manually lifting the intermediate portion of the tire chain C and positioning same over the upper portion of the tread of the tire T whereby the inner side chain $C^1$ will fall into position at the rear of the tire.

Such means in a preferred embodiment thereof comprises a pair of rods 10 operatively associated with and connected to the inner side chain $C^1$.

One of such rods is illustrated in detail in Figs. 3 and 4 and wherein it will be seen that same comprises an elongated arcuate body portion 11 and opposite end loops 12 which loops as is more particularly shown in Fig. 4 are of generally rectangular form whereby the inner walls thereof conform to opposite walls of a link L of the inner side chain for restraining relative axial movement between the rod and chain and the adjacent chain links $L^1$ will confine loops 12 to engagement with the links L.

The rods 10 are positioned on the inner side chain $C^1$ substantially as shown in Fig. 1 whereby their upper ends are adjacent the two uppermost cross chains $C^3$ and the lower ends of the rods are adjacent the two lowermost cross chains. The rods 10 have a loose connection with the side chain $C^1$ by means of links 13 which surround the rods and a link on the side chain.

In operation, a person P need only grasp corresponding ends of the rods 10 with his two hands in the manner shown in Fig. 2. With the ends of the rods thus grasped, the chain will be bodily lifted upwardly between the tire T and the fender with the rods positioned at the back of the tire tread whereby upon release of the rods the upper central portion of the chain C will be positioned over the upper portion of the tread of the tire. Thereafter the balance of the chain is draped downwardly over the tire with the two lowermost cross chains disposed at opposite sides of the area of contact between the tire and the ground. The inner side chain then has its opposite ends secured by reaching around the tire and fastening the hook H. Thereafter the outer side chain has its ends secured together.

It is to be particularly observed that the loops 12 at the opposite ends of the lifting rods 10 extend completely around the adjacent chain links in a manner whereby the links cannot turn in the loops. This is extremely important as the weight of the chain on the inside of the tire after the chain is mounted on the tire cause the lifting rods to assume their proper positions adjacent to the inner side chain. Experiments have shown that the use of round loops at the ends of the rods failed to bring the rods into the desired position on the tire. For successful operation the rods must fit quite snugly against the side chain.

Having set forth my invention in accordance with a preferred structural embodiment thereof, what I claim and desire to secure by U. S. Letters Patent is:

In a tire chain comprising inner and outer side chains, cross chains having their opposite ends connected to the respective side chains, and releasable fastening means for the ends of each of the inner and outer side chains; the improvement comprising means for applying the chain to a vehicle tire which includes a pair of elongated arcuate rods disposed contiguous to the inner side chain, corresponding first ends of said rods each being connected to a link of the inner side chain in spaced relation to the said releasable fastening means therefor, and corresponding second ends of the rods each being connected to a link of the inner side chain, adjacent the central portion thereof, and said first rod ends being hand grippable for lifting the said central portion of the inner side chain over the upper tread portion of a tire and to the inner side thereof, said connections of the ends of the rods to the inner side chain comprising a generally rectangular loop on each end of each rod and which loops are in substantial right angular relation to the rods, the loops having inner dimensions for receiving vertically disposed links of the side chain, whereby the said links cannot turn in the loops for the purpose set forth, and a link on said inner side chain loosely engaged with each rod intermediate its ends.

References Cited in the file of this patent

UNITED STATES PATENTS

| | | |
|---|---|---|
| 1,906,034 | Woolley | Apr. 25, 1933 |
| 1,989,217 | Sisk | Jan. 29, 1935 |
| 2,222,891 | Ransom | Nov. 26, 1940 |
| 2,572,045 | McLean | Oct. 23, 1951 |

FOREIGN PATENTS

| | | |
|---|---|---|
| 522,878 | France | Aug. 8, 1921 |